United States Patent [19]

Tanaka et al.

[11] Patent Number: 4,835,700
[45] Date of Patent: May 30, 1989

[54] NUMERICAL CONTROL DATA CREATION METHOD

[75] Inventors: Kunio Tanaka; Yasushi Onishi, both of Tokyo, Japan

[73] Assignee: Fanuc Ltd., Minamitsuru, Japan

[21] Appl. No.: 76,210

[22] PCT Filed: Oct. 30, 1986

[86] PCT No.: PCT/JP86/00547
§ 371 Date: Jun. 30, 1987
§ 102(e) Date: Jun. 30, 1987

[87] PCT Pub. No.: WO87/02796
PCT Pub. Date: May 7, 1987

[30] Foreign Application Priority Data

Oct. 31, 1985 [JP] Japan .................. 60-244771

[51] Int. Cl.$^4$ .......................... G05B 19/403
[52] U.S. Cl. .................. 364/474.23; 364/192; 364/190
[58] Field of Search ............. 364/146, 147, 167–171, 364/188, 189, 190, 474, 475, 521, 474.22–474.27, 191, 192

[56] References Cited

U.S. PATENT DOCUMENTS

| | | | |
|---|---|---|---|
| 3,739,157 | 6/1973 | Bobrowicz | 364/191 |
| 4,315,315 | 2/1982 | Kossiakoff | 364/300 |
| 4,530,046 | 7/1985 | Munekata | 364/191 |
| 4,536,840 | 8/1985 | Borta | 364/300 |
| 4,546,435 | 10/1985 | Herbert et al. | 364/300 |
| 4,587,608 | 5/1986 | Kishi | 364/191 |
| 4,627,015 | 12/1986 | Stephens | 364/900 |
| 4,656,603 | 4/1987 | Dunn | 364/900 |
| 4,663,705 | 5/1987 | Kishi | 364/191 |
| 4,667,294 | 5/1987 | Shima | 364/474.21 |
| 4,672,575 | 6/1987 | Stephens | 364/900 |

Primary Examiner—Allen MacDonald
Attorney, Agent, or Firm—Staas & Halsey

[57] ABSTRACT

A machining process sequence defined by machining definition steps is displayed on a display screen in the form of a flowchart (FLC). In subsequently performed processing for automatically deciding a machining process sequence, the machining process sequence is revised in such a manner that machining processes (e.g. 01/01, 02/01, 03/01), the order of which must not be changed, are arranged in a serial machining sequence and machining processes (e.g. 02/01, 02/02, 02/03, 02/04, 02/05), the order of which may be changed, are arranged in parallel. NC data are created on the basis of the revised machining process sequence.

7 Claims, 13 Drawing Sheets

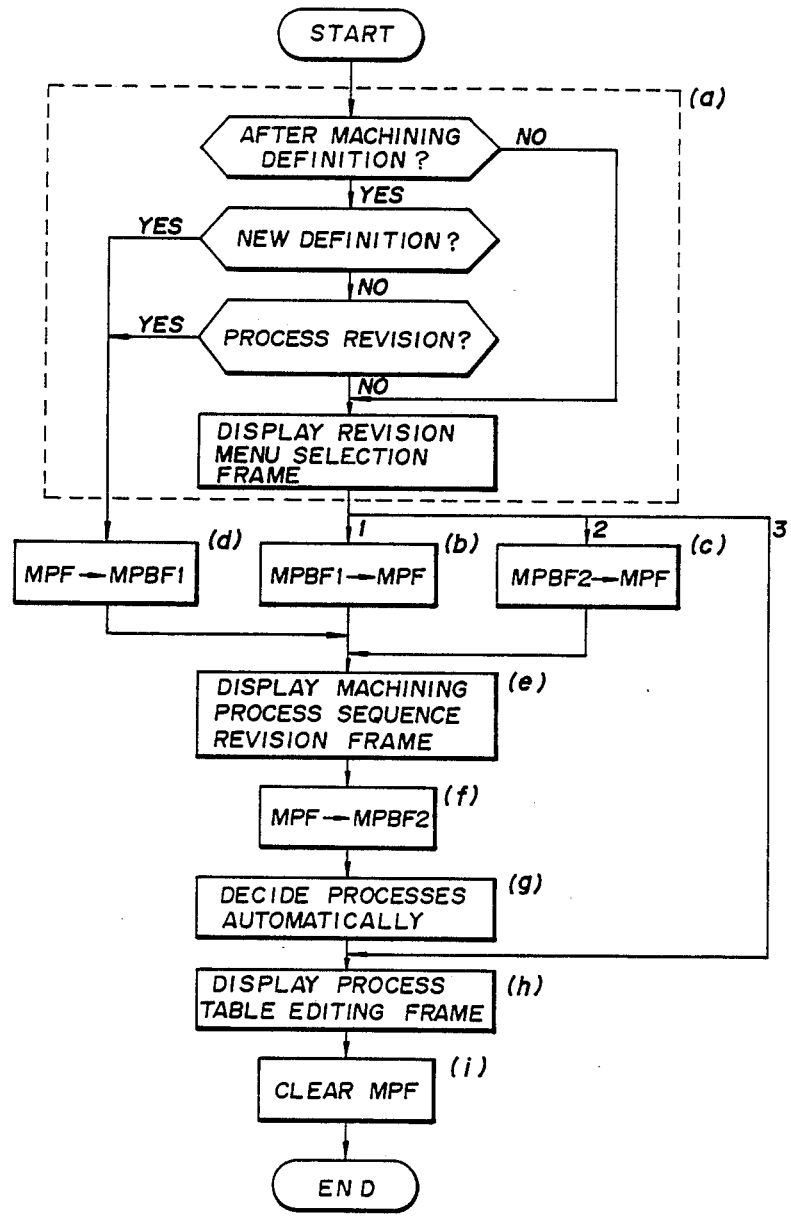

FIG. 3(B)

=*= FAPT =*=

1. MACHINING DEFINITION
2. MACHINING PROCESS EDIT
3. NC DATA CREATION

0. END

NO. = _

R0: AUTOMATIC ADVANCE
R2: SET

*FIG. 3(C)*

\*\*\* MACHINING DEFINITION \*\*\*　　　　MACHINING FACE 01　　01-03

MACHINING 01

------<K0/K1:PAGE>-------- MACHINING -----<K2/K3:ITEM>------
MACHINING TYPE　　　　　　MACHINING 01 = ■■
  1. FACE MILLING
  2. POCKET MACHINING
  3. CONTOUR MACHINING
  4. DRILLING

MACHINING 01 = 1 _

FIG. 3(D)

*MACHINING DEFINITION*　　　　　　　MACHINING FACE 01　　01-03

```
MACHINING 01    FACE MILLING        SHAPE : FACE-1
MACHINING 02    POCKET MACHINING    SHAPE : POCKET-1
MACHINING 03    CONTOUR MACHINING   SHAPE : ISLAND-1
MACHINING 04    CONTOUR MACHINING   SHAPE : CONTOUR-1
MACHINING 05    DRILLING            SHAPE : DRILL-1
MACHINING 06    DRILLING            SHAPE : DRILL-2
MACHINING 07    DRILLING            SHAPE : TAP-1
MACHINING 08
```
↙ MPF

――――――〈K0/K1 : PAGE〉―――――MACHINING 08 =―――――〈K2/K3 : ITEM〉――――

MACHINING TYPE
1. FACE MILLING
2. POCKET MACHINING
3. CONTOUR MACHINING
4. DRILLING

MACHINING 08 = _

*FIG. 3(E)*

```
*** PROCESS EDIT ***            MACHINING PROCESS TABLE         02-01

PROCESS 01  T0001    #0002  φ101.6  FACE-MILL              H10   D■■
       -01  FACE MILLING              MACHINING FACE 01 FACE-1
PROCESS 02  T0013    #0137  φ  32.   END-MILL              H17   D15
       -01  POCKET MACHINING          MACHINING FACE 01 POCKET-1
       -02  CONTOUR MACHINING         MACHINING FACE 01 ISLAND-1
       -03  CONTOUR MACHINING         MACHINING FACE 01 CONTOUR-1
PROCESS 03  T0031    #0303  φ   2.   CENTER DRILL          H25   D■■
       -01  CENTER DRILLING           MACHINING FACE 01 DRILL-1
       -02  CENTER DRILLING           MACHINING FACE 01 DRILL-2
       -03  CENTER DRILLING           MACHINING FACE 01 TAP-1
PROCESS 04  T0043    #0480  φ  12.   DRILL                 H32   D■■
       -01  DRILLING                  MACHINING FACE 01 DRILL-1
       -02  DRILLING                  MACHINING FACE 01 DRILL-2
PROCESS 05  T0061    #0605  φ  30.   COUNTER SINK          H40   D■■
       -01  COUNTERSINKING            MACHINING FACE 01 DRILL-2
                            ----< K0/K1: PAGE >----

MACHINING PROCESS EDIT:
  1. NEW                                  R0: END
  2. PROCESS FLOW EDIT                    R2: TABLE FORMAT
  3. PROCESS TABLE EDIT
  NO. =
```

FIG. 3(G)

```
*** PROCESS EDIT ***        MACHINING PROCESS TABLE           02-04

PROCESS 01  T0001    #0002  φ101.6  FACE-MILL           H10    D■■
   -01  FACE MILLING                MACHINING FACE 01 FACE-1
PROCESS 02  T0013    #0137  φ 32    END-MILL            H17    D15
   -01  POCKET MACHINING            MACHINING FACE 01 POCKET-1
   -02  CONTOUR MACHINING           MACHINING FACE 01 ISLAND-1
   -03  CONTOUR MACHINING           MACHINING FACE 01 CONTOUR-1
PROCESS 03  T0031    #0303  φ 2     CENTER DRILL        H25    D■■
   -01  CENTER DRILLING             MACHINING FACE 01 DRILL-1
   -02  CENTER DRILLING             MACHINING FACE 01 DRILL-2
   -03  CENTER DRILLING             MACHINING FACE 01 TAP-1
PROCESS 04  T0043    #0480  φ 12.   DRILL               H32    D■■
-----------------------< K0/K1: PAGE >----------------------
START OF RANGE OF MOVEMENT:   DESTINATION:
 MAIN PROCESS NO. ----- MNS = ■■       MAIN PROCESS NO. ----- MNP = ■■
 SUB-PROCESS NO. ------ SNS = ■■       SUB-PROCESS NO. ------ SNP = ■■
END OF RANGE OF MOVEMENT:
 MAIN PROCESS NO. ----- MNE = ■■
 SUB-PROCESS NO. ------ SNE = ■■
                                                     R0 : END

MNS = _
```

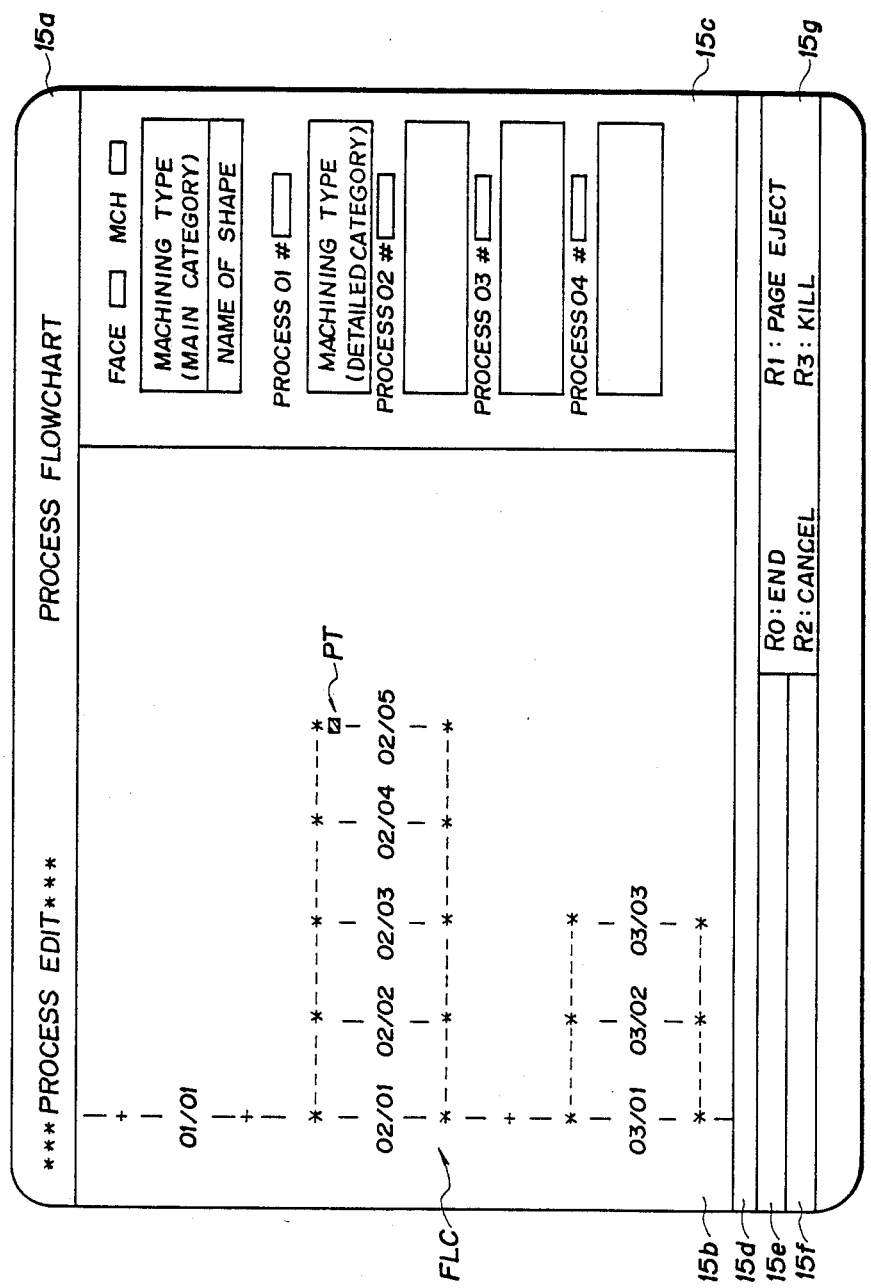

FIG. 5(A)  FIG. 5(B)  FIG. 6(A)  FIG. 6(B)
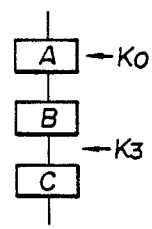 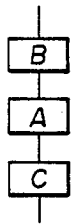 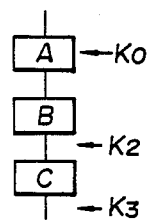 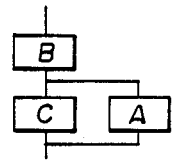
FIG. 7(A)  FIG. 7(B)  FIG. 8(A)  FIG. 8(B)
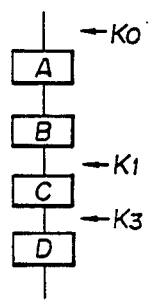 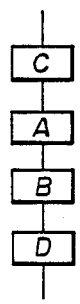 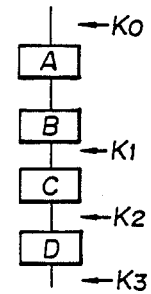 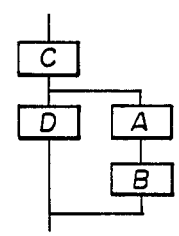
FIG. 9(A)
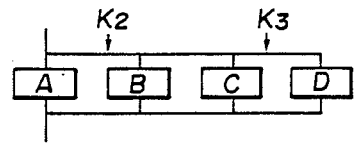
FIG. 10(A)  FIG. 10(B)
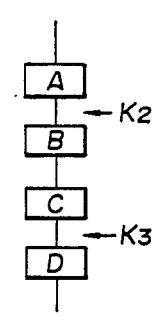 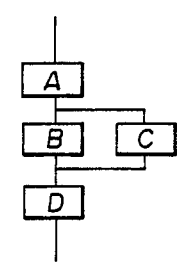
FIG. 9(B)
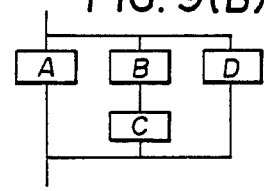

NUMERICAL CONTROL DATA CREATION METHOD

BACKGROUND OF THE INVENTION

1. Field of the Invention

This invention relates to a numerical control (NC) data creation method and, more particularly, to an NC data creation method through which a machining process sequence is decided so that a workpiece machined in accordance with the machining process sequence can be machined into a desired shape and that such machining can be performed very efficiently.

2. Description of the Related Art

In a machining center, a blank is machined into a desired shape via a plurality of machining processes. For example, predetermined face milling, pocket machining, contour machining and drilling processes are applied to each and every face of a blank to machine the blank into a desired shape.

Conventionally, automatically creating the NC data for such machining processes entails the following:

(a) defining the machining processes, machined shape, tools, machining conditions and the like for every machined face;

(b) editing of each machining process (i.e. defining the sequence of the machining processes); and (c) creating NC data, using the data inputted at step (a), in accordance with the machining process sequence decided in the machining process editing operation.

The machining process editing operation of step (b) is necessary for the following reason: In the machining definition step (a), great value is placed upon the ease with which definitions can be made. Therefore, if NC data were created for the purpose of performing machining merely in the order of the definitions, there would be causes in which the desired shape could not be obtained with the NC data or, even if the desired shape could be obtained, the machining would be performed inefficiently, resulting in a prolonged machining time. Accordingly, in the machining process editing operation of step (b), the machining process sequence is altered so as to minimize the number of tool changes without disturbing the sequence of those machining processes that must be performed in a certain order (i.e. those processes having machining sequence dependence).

FIG. 11 is a view for describing "machining sequence dependence". In FIG. 11, pocket machining (P1 or P2) is performance after face milling (F), and this is followed by drilling processes (D1, D2). More specifically, pocket machining (P1) must be performed after face milling (F), and drilling (D1) must be carried out after pocket machining (P1). Further, pocket machining (P2) must be performed after face milling (F), and drilling (D2) must be carried out after pocket machining (P2). However, once face milling has been performed, it does not matter whether pocket machining P1 or P2 is performed first. A case where a machining process must be completed before another machining process is carried out represents a machining process limitation and such processes are referred to as having "machining sequence dependence".

Accordingly, in the machining processing editing of step (b), machining processes that are dependent upon a machining sequence are specified and it is necessary to decide a machining process sequence that will reduce the number of tool changes so that machining will be performed efficiently.

Conventionally, however, difficulties are involved in specifying, through a simple manipulation, machining processes having machining sequence dependence, and in deciding machining processes through which machining can be performed efficiently while the machining sequence dependence is maintained.

SUMMARY OF THE INVENTION

Accordingly, an object of the present invention is to provide an NC data creation method having a machining sequence decision step through which it is possible to specify, through a simple operation, machining processes having machining sequence dependence and machining processes not having machining sequence dependence.

Another object of the present invention is to provide an NC data creation method having a machining sequence decision step, in which a machining process sequence is expressed by a flowchart, machining processes having machining sequence dependence are rearranged in series and machining processes not having machining sequence dependence are rearranged in parallel so that "machining sequence-dependent processes" and "machining sequence-independent processes" can be identified by the system.

Stil another object of the present invention is to provide an NC data creation method through which only a sequence of machining processes not having machining sequence dependence is decided so as to reduce the number of tool changes while machining sequence dependence is maintained, and through which NC data for NC machining are created in accordance with the machining process sequence.

DISCLOSURE OF THE INVENTION

A machining process sequence is expressed in the form of a flowchart, machining processes having a serial arrangement are taken as being machining sequence dependent, and machining processes having a parallel arrangement are taken as being machining sequence independent. Therefore, machining sequence-dependent processes are rearranged to lie in series with one another, and machining sequence-independent processes are rearranged to lie in parallel with one another, whereby it can be distinguished which machining processes have machining sequence dependence.

Accordingly, a machining process sequence defined in a machining definition step is displayed in the form of a flowchart on a display screen in a machining process editing step, the machining process sequence is edited in such a manner that machining sequence-dependent processes are arranged in series and machining sequence-independent processes are arranged in parallel, and NC data are created on the basis of the edited machining process sequence.

BRIEF DESCRIPTION OF THE DRAWINGS

FIG. 2(B) is a flowchart of machining process sequence revision processing;

FIGS. 3(A)–3(G) are screen views of conversational displays for inputting, in a conversational mode, data necessary for NC data creation;

FIG. 4 is a screen view of a machining process sequence revision display;

FIGS. 5(A) through 10(B) are flowchart diagrams for describing an operation through which a machining process sequence is corrected;

DESCRIPTION OF THE PREFERRED EMBODIMENT

Figure 11:
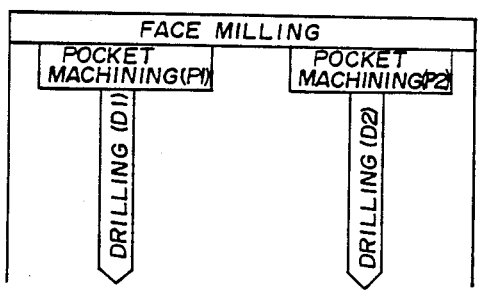
FIG. 11 is a functional sequence for describing machining sequence dependence.
Figure 12:
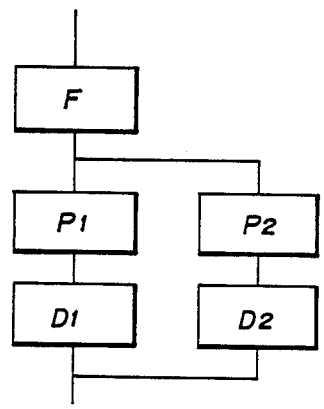
FIG. 12 is a flowchart illustrating the machining sequence of FIG. 11.
Figure 13A:
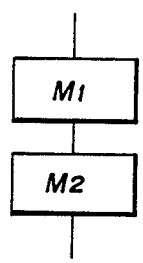
FIGS. 13(A) and 13(B) are flowcharts for describing machining sequence dependence in a flowchart.
Figure 13B:
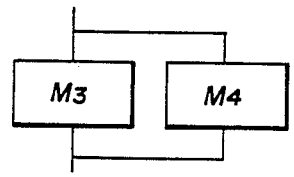

When a machining process sequence is expressed in the form of a flowchart, the machining sequence of FIG. 11 appears as shown in FIG. 12. Based on this flowchart, the system can recognize a serial arrangement as being machining sequence dependent and a parallel arrangement as being machining sequence independent. The system recognizes that serially connected machining processes M1, M2 shown in FIG. 13(A) are machining sequence dependent, so that the positions thereof cannot be interchanged. The system recognizes that parallel-connected machining processes M3, M4 shown in FIG. 13(B) are machining sequence independent, so that the positions thereof can be interchanged (i.e. so that the machining sequence can be changed).

Accordingly, in the present invention, a machining process sequence defined in a machining definition step is displayed as a flowchart on a display screen, "machining sequence-dependent" processes are rearranged to lie in series and "machining sequence-independent" processes are arranged to lie in parallel. Thereafter, the system is made to put parallel portions in a sequence that will reduce the number of tool changes and to recognize the machining process sequence. The system is made to create NC data in accordance with the machining process sequence obtained.

Figure 1:
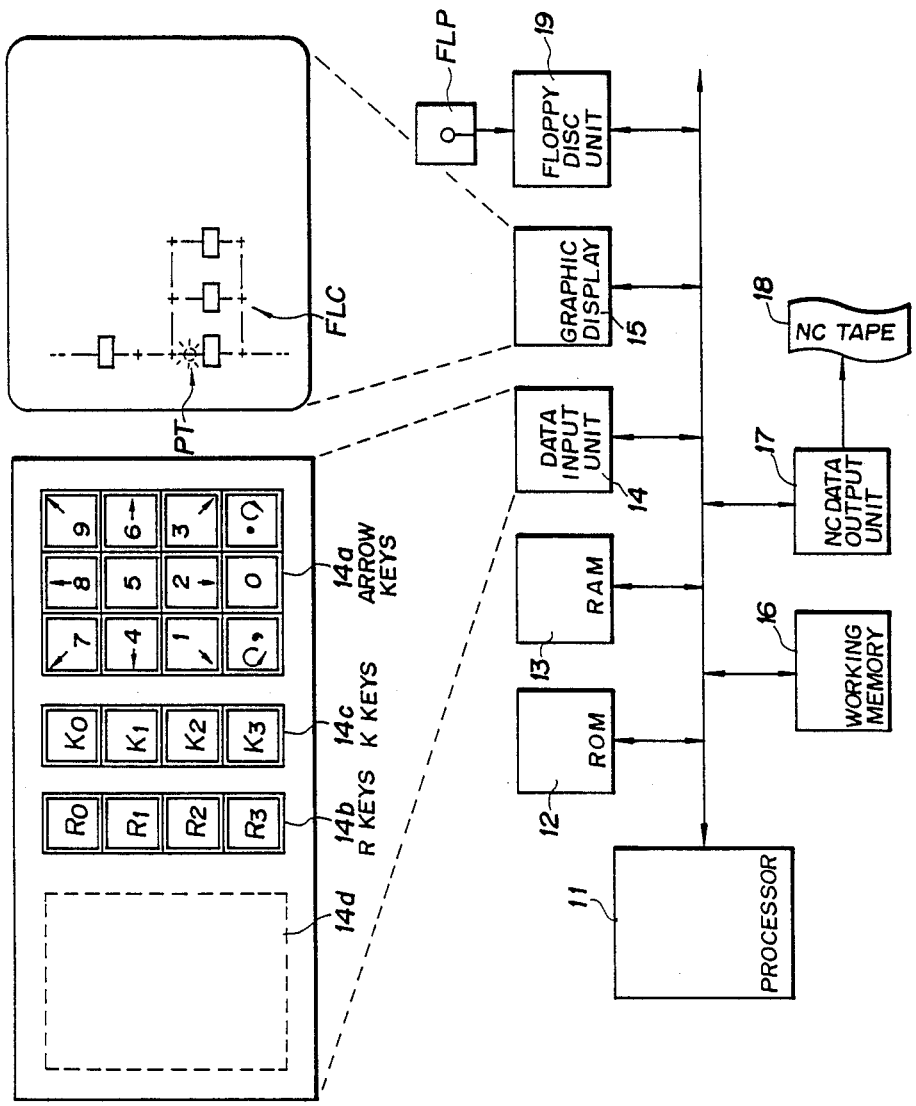
FIG. 1 is a block diagram of an automatic programming apparatus for realizing the present invention.

FIG. 1 is a block diagram of a automatic programming apparatus for practicing the present invention.

Numeral 11 denotes a processor, 12 a ROM, 13 a RAM, 14 a data input unit such as a keyboard, 15 a graphic display unit, 16 a working memory, 17 an NC data output unit, 18 an NC tape, and 19 a floppy disc unit.

The data input unit 14 is provided with an arrow key group 14a, an R key group 14b, a K key group 14c, and a group 14d of other keys.

Figure 2A:
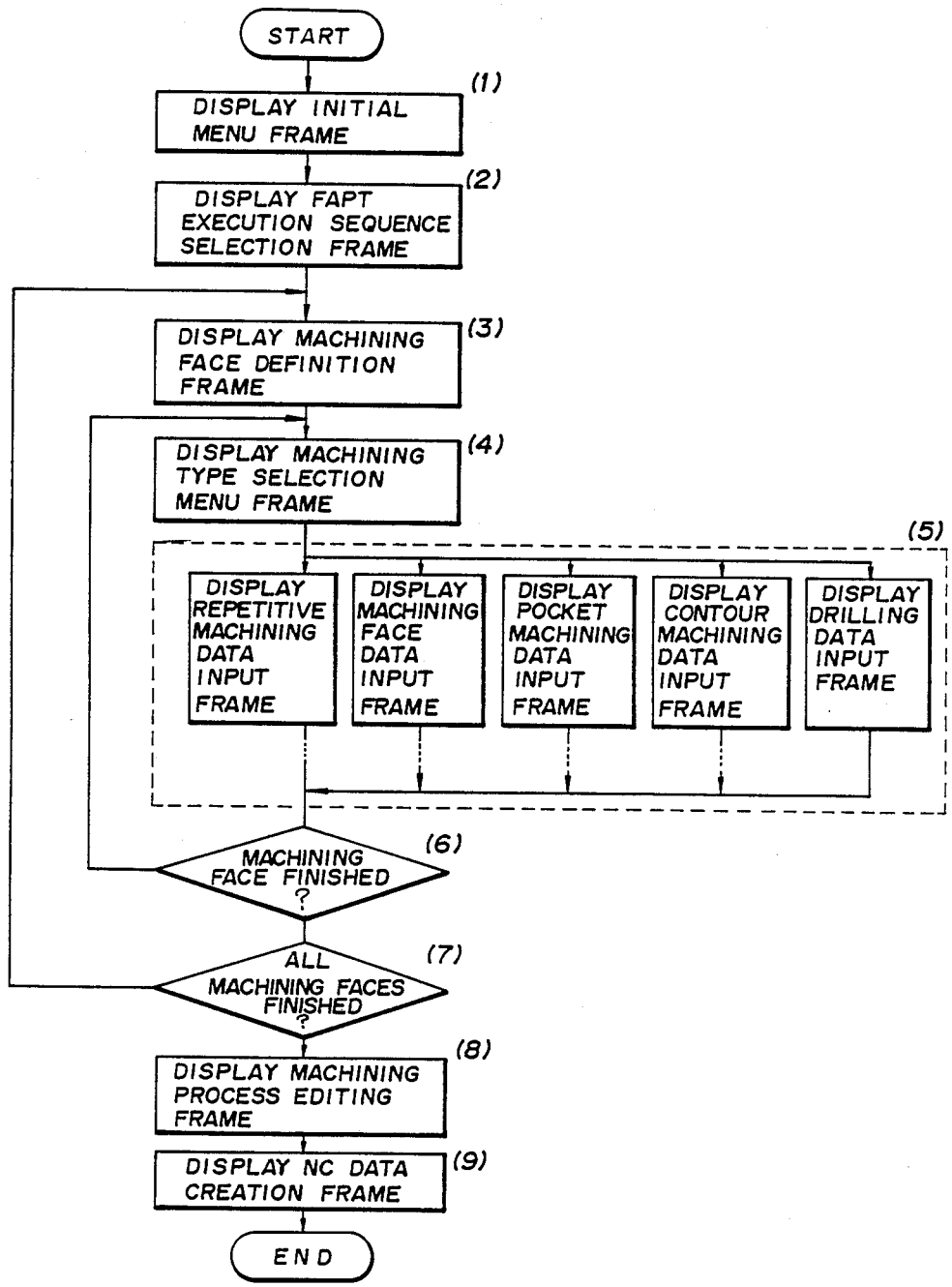
FIG. 2(A) is a flowchart of processing illustrating the NC data creation method of the invention.
Figure 3A:
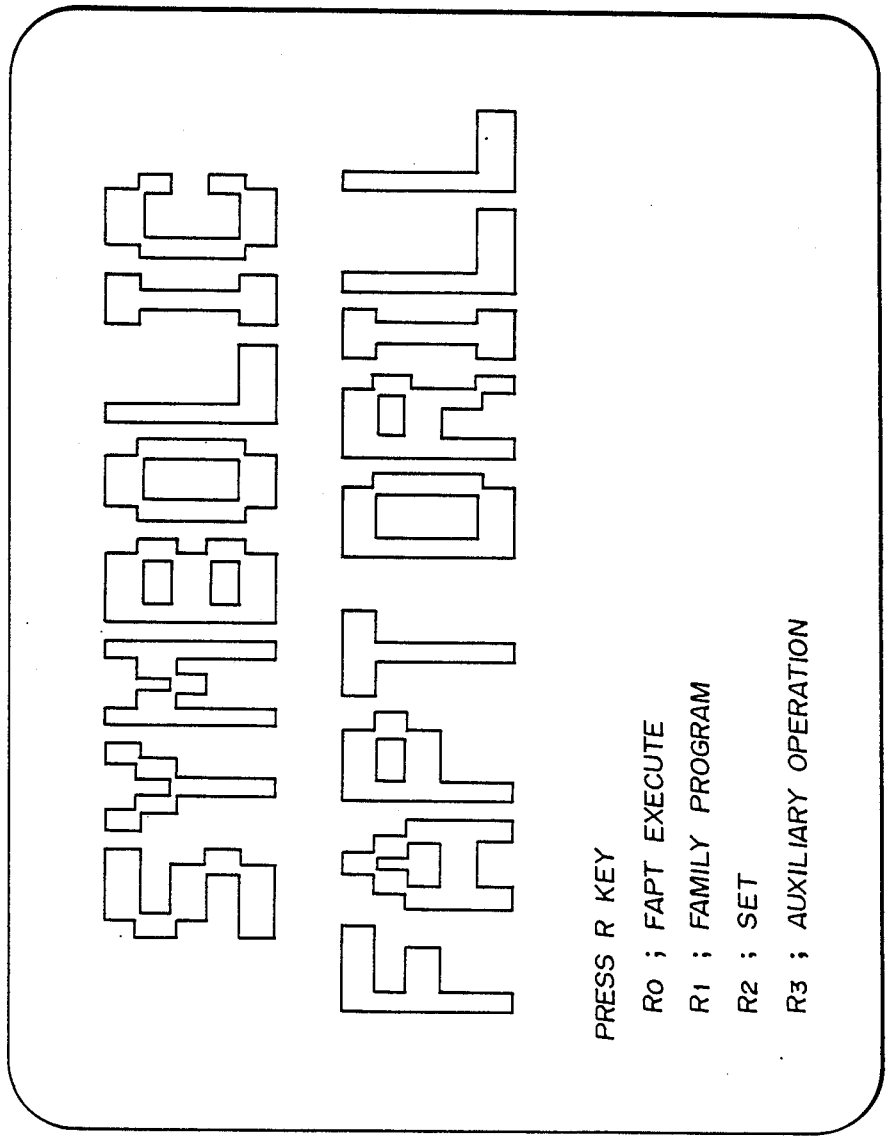

FIG. 2 is a flowchart illustrating an NC data creation method according to the invention, and FIGS. 3 and 4 are screen views of conversational mode displays of various steps.

(1) After power is introduced to the automatic programming apparatus, an NC data creation program stored on a floppy disc FLP is loaded into the RAM 13 under the control of a loading program stored in the ROM 12. As a result, an initial menu display shown in FIG. 3(A) appears on the CRT screen of the graphic display unit 15.

(2) When an $R_0$ key on the data input unit 14 is pressed in a state where an initial menu is being displayed, "FAPT EXECUTE" is selected, whereupon a menu appears for selecting an executing sequence shown in FIG. 3(B).

(3) Thereafter, when a 1 key and NL key on the data input unit are pressed to select "MACHINING DEFINITION", a display for defining a machining face appears on the CRT. Accordingly, the necessary data are inputted on the basis of the display to define the machining face, machining range, the material to be cut, etc.

(4) When selection of the machining face, machining range and materials to be cut ends, a machining type selection menu appears on the CRT screen, as shown in FIG. 3(C). Since face milling, pocket machining, contour machining and drilling appear as the types of machining, the prescribed machining types are selected by inputting Menu Nos. 0 through 4.

(5) The data necessary for machining conforming to the types of machining selected are then inputted conversationally.

(6) When the inputting of the data necessary for machining ends, a check is made to determine whether the data necessary for complete machining of the face specified in step (3) have been inputted. If the data have not been inputted, the operations from step (4) onward are repeated. As shown in FIG. 3(D), machining processes are sequentially displayed on the display screen in the order of the definitions. The machining process sequence MPF is the initial machining process sequence.

(7) If all data for the machining face have been inputted, a check is made to determine whether the inputting of data for all faces has ended. If the inputting of the data has not ended, a new machining face is specified at step (3) and operations similar to the foregoing are repeated.

This ends machining definition.

When machining definition is concluded by ending the inputting of all data indicative of the machining faces, the processor 11 stores the machining process sequence MPF specified by the machining definition in the RAM 13 as an initial machining process sequence MPBF1.

(8) At the end of machining definition, the $R_0$ key is pressed to display the execution sequence selection menu shown in FIG. 3(B) on the display screen, after which a 2 key and the NL key are pressed to select "MACHINING PROCESS EDIT". This is followed by executing machining process editing processing in a conversational manner.

Processing for editing machining processes may be classified roughly as follows:

(i) processing using a flowchart for inputting data related to machining sequence dependence (processing for rearranging a machining process sequence);

(ii) processing for automatically deciding a machining sequence without disturbing machining sequence dependence; and (iii) processing for manually correcting a machining sequence.

Processing for editing machining processes will now be described in accordance with the flowchart of FIG. 2(B).

(a) When "MACHINING PROCESS EDIT" is selected after machining definition data are newly created in the machining definition step or after a revision is made in the machining definition step so as to change the constitution of a machining process, the program jumps to a step (d). Otherwise, the revision menu selection display shown in FIG. 3(E) is caused to appear on the display screen by selecting "MACHINING PROCESS EDIT". In the machining process table of FIG. 3(E), process numbers are assigned in the order 01, 02, . . . , one to every machining process group capable of being executed by one tool.

(b) If Menu No. 1 is inputted to select "NEW" on the revision menu selection display, the machining process sequence to be processed by the processor is an initial state (the sequence which prevails at the time of machining definition) (MPBF1→MPF). Note that MPBF1 signifies the machining process sequence in the initial state, and that MPF signifies a machining process sequence which is the present object of processing by the processor.

(c) If Menu No. 2 is inputted to select "PROCESS FLOW EDIT" on the revision menu selection display, the machining process sequence MPF to be processed by the processor 11 becomes the preceding revised machining process sequence MPBF 2 (stored in the RAM 13) (MPBF 2→MPF).

If Menu No. 3 is inputted to select "PROCESS TABLE EDIT", then the program proceeds to a step (h), at which the process table can be edited manually.

(d) In step (a), when "MACHINING PROCESS EDIT" is performed immediately after a program is newly created in the machining definition step, the machining process sequence MPF [see FIG. 3(D)] in accordance with the order of the machining process definitions is stored and preserved in the RAM 13 as the initial machining process sequence MPBF1 (MPF→MPBF1).

Figure 3F:
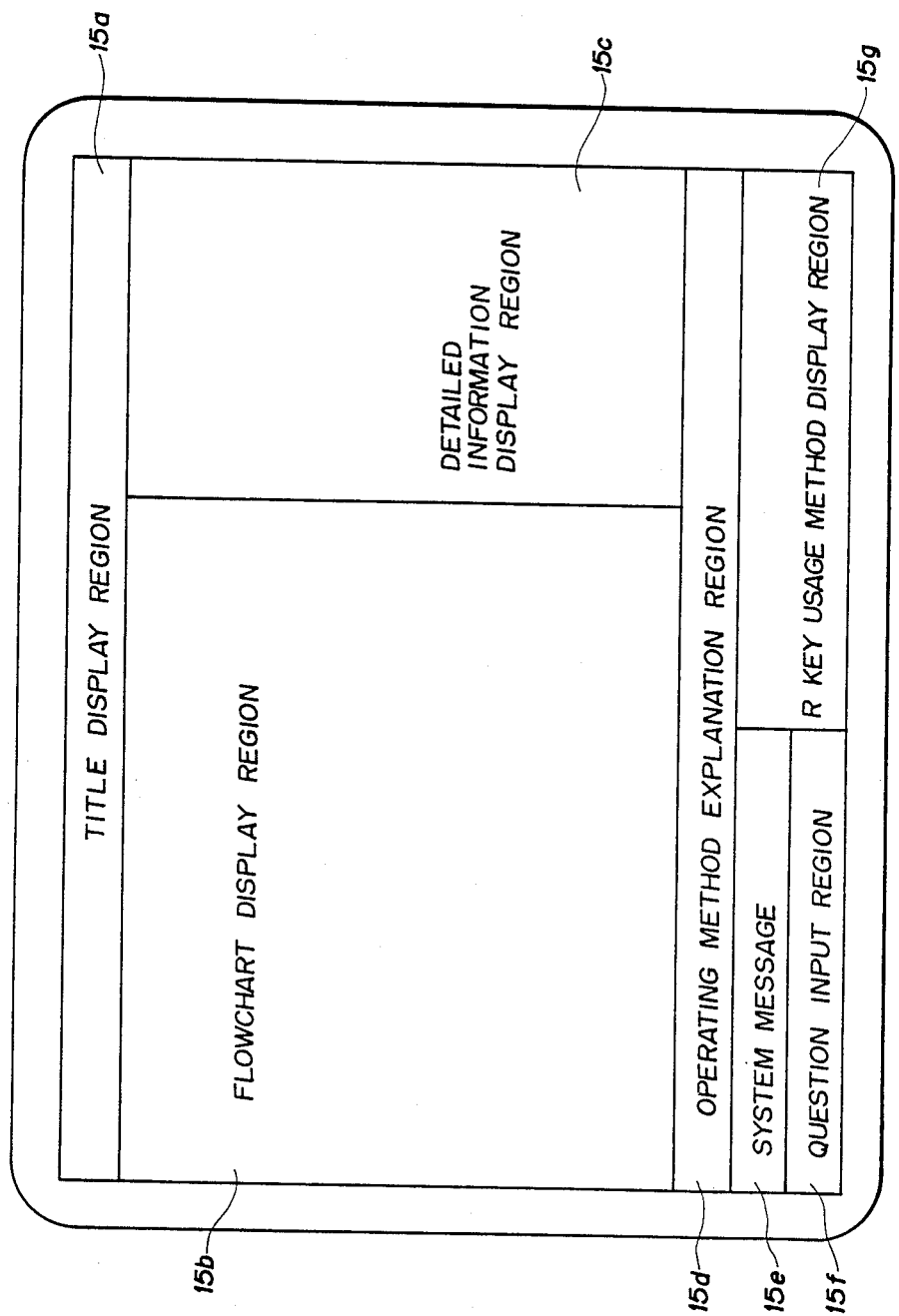

(e) When the processing of any of steps (b) through (d) ends, the processor causes the machining process sequence revision display, in which the machining process sequence MPF is expressed as a flowchart, to be displayed on the CRT screen [see FIG. 3(F) and FIG. 4]. This makes it possible to rearrange machining processes.

In the machining process sequence revision display, (i) a display region 15a is a title display region in which a message representing the title of the display appears, (ii) a display region 15b is a flowchart display region in which a flowchart FLC (FIG. 4) illustrating machining sequence dependence is displayed, (iii) a display region 15c is a detailed information display region for displaying detailed information (type of machining, name of shape, etc.) relating to a position (machining process) designated on the flowchart FLC by a pointer (graphic cursor) PT, (iv) a display region 15d is an operating method explanation region which displays a message describing an operating method, (v) a display region 15e is a system message display region which displays input prompting messages and error messages from the system, (vi) a display region 15f is a question input region, and (vii) a display region 15g is for displaying messages describing a method of using the R keys.

A portion of a flowchart expressing a machining process sequence for all processes appears on the machining process revision display. The pointer PT (see FIG. 4) is used to designate a predetermined position displayed on the display screen. The pointer PT is moved freely in units of one character inside the flowchart display region 15b in directions designated by pressing arrow keys ↑,↗,→,↘,↓,↙,←,↖ on data input unit 14 (see FIG. 1). For example, the pointer PT can be moved one character upward by pressing the ↑ key, and can be moved one character to the right and one character upward by presing the ↗ key. When the pointer PT is moved outside the flowchart display region 15b, the flowchart illustrating the machining process sequence is scrolled in units of one page, so that the pointer position is always displayed on the screen.

If nn/mm (where nn is a machining face number and mm is a process number) indicating a machining process is present at a position designated by the pointer PT, then detailed data relating to the machining process are displayed in the detailed information display region 15c on the right side of the screen.

If the display data cannot fit on one page, the page can be turned by pressing the "$R_1$" key, thus enabling the remaining data to be displayed.

The flowchart revision operation, namely an operation for rearranging machining processes while specifying whether "machining sequence dependence" holds, is carried out in a manner set forth hereinbelow. The rearranging operation is carried out by moving the pointer PT and using the K keys ($K_0$-$K_3$) 14c provided on the data input unit 14. A general rearrangement method entails moving the pointer PT to a target position and designating the contents of the operation by pressing the predetermined K key at said position. The general meanings of the K keys are as follows:

(i) the $K_0$ key is for designating a starting position at which movement originates;

(ii) the $K_1$ key is for designating an end position at which movement originates;

(iii) the $K_2$ key is for designating a starting position of the destination of movement or a starting position of the object of rearrangement; and (iv) the $K_3$ key is for designating an end position of the destination of movement or an end position of the object of rearrangement, and is for executing the movement and rearrangement.

(1) Serial movement of a process

To revise the position of any one process (e.g. process A), which is included among serially connected processes shown in FIG. 5(A, as illustrated in FIG. 5(B), first the K0 key is pressed (to specify the origin of movement) in a state where process A is designated by the pointer PT. Next, the pointer PT is moved to designate the position between processes B and C, in which state the $K_3$ key is pressed (to specify the destination of movement), whereupon the flowchart is immediately revised from that shown in FIG. 5(A) to that shown in FIG. 5(B).

(2) Parallel movement of a process

To revise the position of any one process (e.g. process A), which is included among serially connected processes shown in FIG. 6(A), as illustrated in FIG. 6(B) (i.e. to place process A in parallel with process C), first the K0 key is pressed (to specify the origin of movement) in a state where process A is designated by the pointer PT. Next, the pointer PT is moved to designate the position between processes B and C, in which state the $K_2$ key is pressed (to specify the starting position of the destination of movement). Thereafter, the pointer is moved to designate the position below process C, in which state the $K_3$ key is pressed (to specify the end point of the destination of movement), whereupon the flowchart is immediately revised from that shown in FIG. 6(A) to that shown in FIG. 6(B).

(3) Serial movement of a plurality of processes

To revise the positions of any of a plurality of processes (e.g. processes A and B), included among serially connected processes shown in FIG. 7(A), as illustrated in FIG. 7(B), first the K₀ key is pressed (to specify starting point of the origin of movement) in a state where the position above process A is designated by the pointer PT. Next, the pointer PT is moved to designate the position between processes B and C, in which state the K₁ key is pressed (to specify the end point of the origin of movement), and then the pointer PT is moved to designate the position between processes C and D, in which state the K₃ key is pressed (to specify the destination of movement), whereupon the flowchart is immediately revised from that shown in FIG. 7(A) to that shown in FIG. 7(B).

(4) Parallel movement of a plurality of processes

To revise the positions of any of a plurality of processes (e.g. processes A and B), included among serially connected processes shown in FIG. 8(A), as illustrated in FIG. 8(B) (i.e. to place processes A and B in parallel with process D), first the K₀ key is pressed (to specify starting point of the origin of movement) in a state where the position above process A is designated by the pointer PT. Next, the pointer PT is moved to designate the position between processes B and C, in which state the K₁ key is pressed (to specify the end point of the origin of movement), and then the pointer PT is moved to designate the position between processes C and D, in which state the K₂ key is pressed (to specify the starting position of the destination of movement). Finally, the pointer is moved to designate the position below the process D, in which state the K₃ key is pressed (to specify the end position of the destination of movement), whereupon the flowchart is immediately revised from that shown in FIG. 8(A) to that shown in FIG. 8(B).

(5) Parallel→serial conversion

To convert processes connected in parallel in the manner shown in FIG. 9(A) (e.g. the parallel connection between processes B and C) into the serial connection shown in FIG. 9(B), first the K₂ key is pressed (to specify the starting position of the object of conversion) in a state where the position between processes A and B is designated by the pointer PT. Next, the pointer PT is moved to designate the position between the processes C and D, in which state the K₃ key is pressed (to specify the end position of the object of conversion and execute the conversion). When this is done, the flowchart is immediately revised from that shown in FIG. 9(A) to that shown in FIG. 9(B).

(6) Serial→parallel conversion

To convert processes connected in series in the manner shown in FIG. 10(A) (e.g. the series connection between processes B and C) into the parallel connection shown in FIG. 10(B), first the K₂ key is pressed (to specify the starting position of the object of conversion) in a state where the position between processes A and B is designated by the pointer PT. Next, the pointer PT is moved to designate the position between the processes C and D, in which state the K₃ key is pressed (to specify the end position of the object of conversion and execute the conversion). When this is done, the flowchart is immediately revised from that shown in FIG. 10(A) to that shown in FIG. 10(B).

(f) When processing for specifying whether processing is machining sequence dependent is concluded by the foregoing flowchart rearrangement operation, the R₀ key is pressed. In response, the processor 11 performs the operation MPF→MPFB2 and stores the latest revised machining process sequence obtained in step (e) in RAM 13.

(g) Thereafter, the processor 11 decides a machining sequence which will not upset the machining sequence dependence specified in step (e), and in such a manner that machining efficiency will be raised (e.g. in such a manner that the number of tool changes will be reduced). Specifically, the processor automatically decides the sequence of all machining processes by adopting the machining sequences of serially connected portions as serial sequences and deciding the sequence solely of parallel-connection portions, namely of the machining processes constituting each parallel portion.

(h) When automatic decision processing ends, the processor causes a process table editing display shown in FIG. 3(G) to appear on the CRT screen. In the process table editing display, processes are displayed in the automatically decided order and the process sequence continuing on to the previous page or next page can be displayed by pressing the K₀ or K₁ key.

With the process table editing display on the CRT screen, the sequence of the machining processes can be revised by inputting, from the data input unit 14, the beginning and end of the range over which movement is desired, as well as the destination of movement. The reason for providing a step through which processes can thus be revised manually after the automatic decision operation is that there are cases where the operator wishes to modify an automatically decided machining process sequence promptly during actual machining.

(i) If the R₀ key is pressed at the conclusion of processing for the manual editing of the process table, the processor clears the process file MPF from the RAM 13 and ends the machining process editing processing.

(9) When the machining process editing processing ends, the processor 11 uses the machining definition data to create NC data in such a manner that machining will be carried out in the machining process sequence that has been decided. The processor then ends the NC data creation processing.

What is claimed is:

1. A method of creating numerical control data for machining a blank into a desired shape through a plurality of machining processes, comprising the steps of:

(a) inputting machining process data, including type of machining to be performed on the blank to produce the desired shape, in an input order;

(b) displaying on a display screen a flowchart illustrating the machining process data from step (a) in a machining process sequence serially according to the input order;

(c) revising the machining process sequence displayed in the flowchart in response to one of (i) designating a first machining process at an origin of movement and a destination of movement for the first machining process and (ii) designating a second machining process which is an object of a serial/parallel rearrangement; and (d) displaying a revised flowchart illustrating a revised machining process sequence in dependence upon said revising in step (c); and (e) creating numerical control data, based on the revised machining process sequence, to perform machining of the blank with the machining processes in any serial portions of the revised machining process sequence to be executed serially and the machining processes in any parallel portions of the revised machining process sequence to be executed without regard to the input order.

2. A method of creating numerical control data according to claim 1, wherein step (b) comprises representing each machining process in the flowchart by a machining face number and a process number.

3. A method of creating numerical control data according to claim 1, wherein step (e) includes sequencing the machining processes in any parallel portions to minimize tool changing.

4. A method of creating numerical control data according to claim 1, wherein step (bi) comprises designating the origin of movement and the destination of movement by a graphic cursor on the display screen.

5. A method of creating numerical control data according to claim 4, further comprising the step of (f) displaying on the display screen detailed contents of a designated machining process, identified by the graphic cursor.

6. A method of creating numerical control data according to claim 5, wherein step (bi) comprises at least two of the following steps:
 (A) depressing a first key to designate a present position of the graphic cursor as a starting position of the origin of movement,
 (B) depressing a second key to designate the present position of the graphic cursor as an end position of the origin of movement,
 (C) depressing a third key to designate the present position of the graphic cursor as a starting position of a destination of movement, and
 (D) depressing a fourth key to designate the present position of the graphic cursor as an end position of the destination of movement.

7. A method of creating numerical control data according to claim 6, wherein step (bii) comprises the step of depressing keys respectively designating a first position of the graphic cursor as a starting position and a second position of the graphic cursor as an end position of the object of the serial/parallel rearrangement.

* * * * *